United States Patent [19]

Hallows

[11] 4,256,091
[45] Mar. 17, 1981

[54] FLUX CONCENTRATING SOLAR FLUID HEATER

[76] Inventor: Kenneth Hallows, 1 Pier St., Glenelg, Australia

[21] Appl. No.: 32,907

[22] Filed: Apr. 24, 1979

[30] Foreign Application Priority Data

Apr. 24, 1978 [AU] Australia ............................. PD4150

[51] Int. Cl.³ ............................. F24J 3/02; F28F 7/00
[52] U.S. Cl. ...................................... 126/438; 126/450; 126/451; 165/79
[58] Field of Search .............. 126/448, 450, 451, 452, 126/417, 439, 438, 441; 165/76, 79

[56] References Cited

U.S. PATENT DOCUMENTS

| | | | |
|---|---|---|---|
| 2,625,930 | 1/1953 | Harris | 126/439 |
| 3,174,915 | 3/1965 | Edlin | 126/451 |
| 4,002,499 | 1/1977 | Winston | 126/439 |
| 4,059,094 | 11/1977 | De Mendoza | 126/439 |
| 4,067,319 | 1/1978 | Wasserman | 126/439 |
| 4,098,019 | 7/1978 | Strong | 126/451 |
| 4,099,515 | 7/1978 | Schertz | 126/438 |
| 4,106,484 | 8/1978 | Dame | 126/438 |
| 4,115,177 | 9/1978 | Nelson | 126/450 |
| 4,116,221 | 9/1978 | Zaugg | 126/438 |
| 4,167,178 | 9/1979 | Brussels | 126/438 |

FOREIGN PATENT DOCUMENTS

2712310  9/1978  Fed. Rep. of Germany ........... 126/438
2827007  1/1979  Fed. Rep. of Germany ........... 126/438

*Primary Examiner*—James C. Yeung
*Assistant Examiner*—Daniel O'Connor
*Attorney, Agent, or Firm*—McAulay, Fields, Fisher, Goldstein & Nissen

[57] ABSTRACT

A solar energy collector having a plurality of elongated upwardly-open trough-shaped reflectors placed side by side and each having facing reflective surfaces joined by a curved section disposed about a medial axis of each trough and supported by a series of templates spaced along the reflectors and having upwardly opening recesses the walls of which engage and shape the reflectors, the edges of the reflectors being held by locking members engaged on the templates between the said recesses, to accurately locate the side edges of the reflectors and hold the reflectors in stressed relationship in the templates, a frame supporting the templates and arranged to be oriented about a horizontal axis, heat collector tube being supported by the said frame and disposed at the focal area of each of the reflectors and constructed to act as an absorber of heat focussed on to it by the reflectors.

7 Claims, 9 Drawing Figures

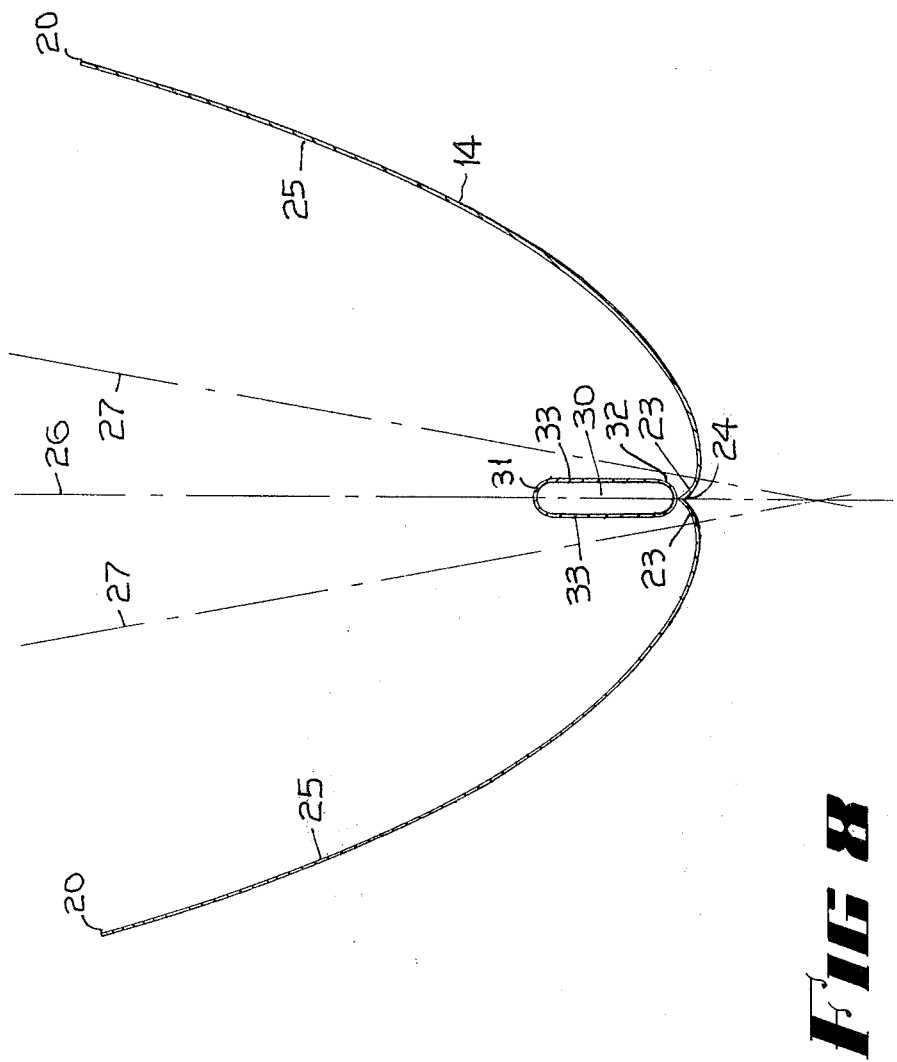

FLUX CONCENTRATING SOLAR FLUID HEATER

This invention relates to a solar energy collector.

FIELD OF THE INVENTION

Solar energy is becoming an important factor in water heating and other industries and it is already well known to provide panels which contain waterways which are associated with a solar absorber to collect energy from the sun and thereby heat water in the waterways.

THE PRIOR ART

The customary method of forming these is to have the water in tubes which are either painted black or otherwise treated to form solar energy absorbers and which generally are associated with fins which collect the energy from a substantial area and transmit it to the water within the tubes or waterways, the waterways usually being disposed in an insulated housing which has an open top, but more usually has the top closed by a transparent membrane, such as a pane of glass or other material transparent to solar radiation, so that, while the heat rays can pass through the glass and reach the waterways or fins associated therewith, air circulation over the waterways or fins is prevented and thereby heat losses are minimised.

There is also already known another type of unit which consists of a series of horizontally positioned but stacked trough shaped upwardly open reflectors which are arranged adjacent to each other such that the rays of the sun during the azimuthal swing are reflected onto tubes passing through the focal zone of the said reflectors, the reflectors being disposed so that the sun in its travel across the sky during a day strikes the reflectors at progressively differing angles so that, while the reflectors are arranged in one plane to receive energy from the sun as it approaches and passes through the zenith, it is nevertheless necessary to orientate the reflectors about a plane at right angles thereto so that the correct angle of the reflectors is maintained during summer and winter. It has therefore in the past been necessry to use mechanism which angles the reflectors from day to day to obtain maximum collection efficiency, and the usual construction therefore of this type of panel is to have a series of transversely positioned reflectors arranged one adjacent to the other and the panel so formed is orientated about a horizontal axis to maintain the rays of the sun in correct focus onto the tube passing through the focal zone of each of the reflectors.

The general theories and practice relating to the field of the invention are generally described in a work edited by A. A. M. SAYIGH of the Mechanical Engineering Department of the College of Engineering, Riyadh, University Saudi Arabia, published by Academic Press, New York, San Francisco and London in 1977 at pages 183 to 216.

OBJECTIVES AND SUMMARY OF THE INVENTION

The object of the present invention is to provide a device of the general nature in which a series of horizontally arranged reflectors are used with heat collector tubes running through them at the focal zone but in which their angle is incrementally adjusted at long intervals to follow the seasons, and this object is achieved by a special arrangement of reflector which is so designed that at most the reflectors need to be positioned at a different angle once a month instead of having constant tracking means operating day by day.

This object of the present invention is achieved by having a series of elongated reflectors of a special cross-sectional shape which has two displaced facing parabolic surfaces directing the rays on to a heat absorbing tubular waterway disposed through the focal area and by means of which the energy of the sun is collected from the refelectors, these reflectors and the tube have a cross-section such that the reflectors instead of directing the rays to a point are directed at an extended surface of the tube, furthermore the rays are so arranged that they strike the absorber pipe at closer to normal incidence than any other device heretofore.

A further object is to provide means to accurately define the contour of the reflectors, and this is achieved by a series of precision templates positioned in a holding frame and having edge locking members into which the sheets which form the reflectors are sprung and by means of which they are deflected to and held at the correct contour. Each reflector is in a stressed state and this stress is transversely transferred and equalised to the strong supporting edges. The longitudinal stress is absorbed by the locking members.

A still further object is to so direct the solar rays on to the heat collector tubes that they strike at an acute angles rather than at a tangent whereby the maximum heat absorption results.

Thus the invention comprises a plurality of elongated upwardly-open trough-shaped reflectors placed side by side and each having facing surfaces preferably of displaced parabolic form joined by a curved section disposed about a medial axis of the trough and preferably with the axes of the parabolic section displaced outwardly from the medial axis and inclined thereto to intersect outside of the reflector beneath the curved joining section, a series of precision templates spaced along the said reflectors and having upwardly opening recesses the walls of which engage and shape the parabolic sections of the reflectors, locking members engaged on the templates between the recesses and engaging the edges of the reflectors to retain them in the recesses, a frame supporting the templates in spaced relationship, means to support the frame to allow it to be orientated about a horizontal axis positioned in line with the axis of the elongated reflectors, and a heat collector tube supported by the frame and disposed at the focal area of each of the reflectors and constructed to act as an absorber of heat focussed on to it by the reflectors.

Another object, details of construction will be apparent from the following description.

DESCRIPTION OF THE DRAWINGS

FIG. 8 is a schematic view of a reflector showing how, when in place on the templates, the surfaces are of parabolic form about two planes inclined to a medial plane, and FIG. 9 is a schematic view showing how the rays of the sun are reflected on to the collector tube when the sun is normal to the medial plane, and showing in dotted lines the reflection when the sun is at 10° on each side of the medial plane.

DESCRIPTION OF THE PREFERRED EMBODIMENT

Figure 1:
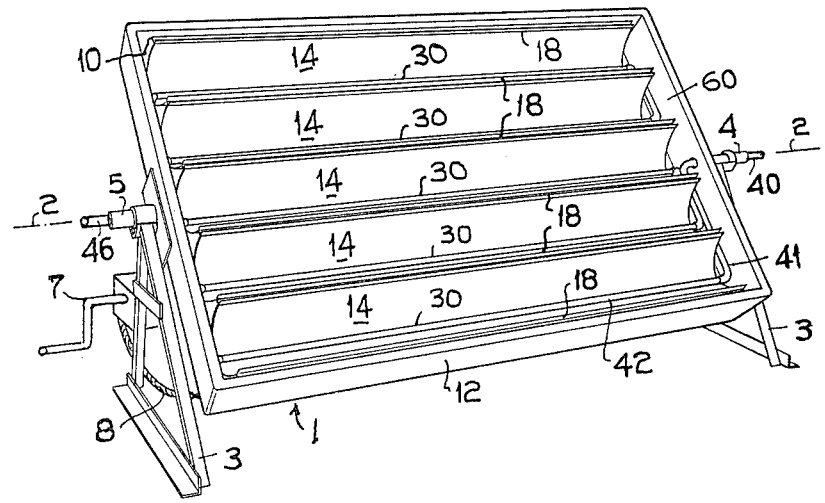
FIG. 1 is a perspective view of a unit constructed according to this invention.
Figure 2:
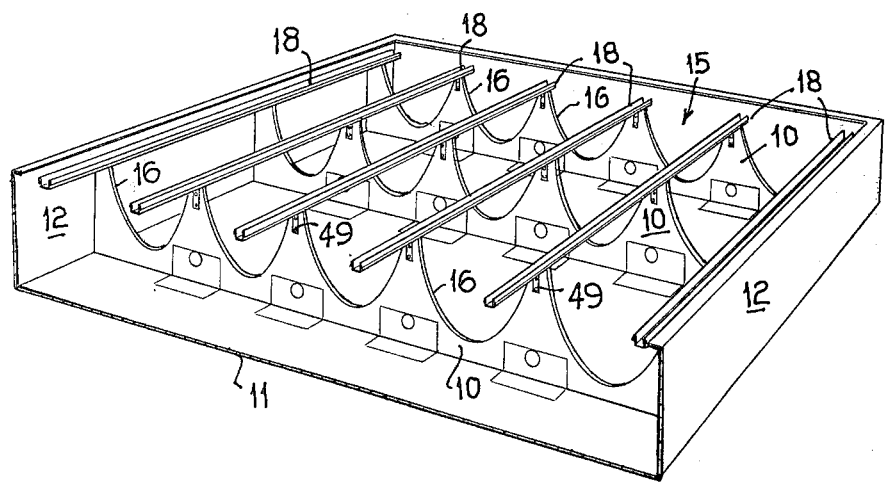
FIG. 2 is a transverse sectional perspective view of the frame which holds the templates and the locking members which engage the sheets which form the reflectors.

The frame 1 is in the nature of an open top flat box constructed of fibreglass or other suitable material and is supported about a horizontal axis 2 on a pair of support members 3, the support members 3 engaging the inlet and outlet members 4–5 respectively through which the fluid to be heated circulates, and the box frame 1 being generally arranged so that it can be tilted about the axis 2 to adjust for seasonal changes in the position of the sun.

The reflectors themselves are designed to accept, when in one position, a 20° change in the north-south angle of the sun in relation to the normal position of the reflectors so that effective heating will occur through a 20° change in inclination of the sun in relation to the reflectors, after which a new position of the frame about the axis 2 is selected.

The mechanism for changing the angle of the frame comprises a winder 7 on the support members 3 coupled through a cable 8 connected to the frame 1 to give the required amount of angulation.

Disposed transversely in the box frame 1 are a series of spaced insulating templates 10 which are fixed to the floor 11 of the box frame 1 and to the upstanding sides 12 thereof to be accurately located to receive the reflectors 14, each of the templates 10 having a series of open topped recesses 15 the walls 16 of which are carefully designed to define the exact shape required of the reflectors.

Figure 5:
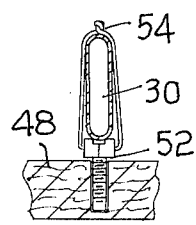
FIG. 5 is a detail of the mounting for the collector tube.
Figure 6:
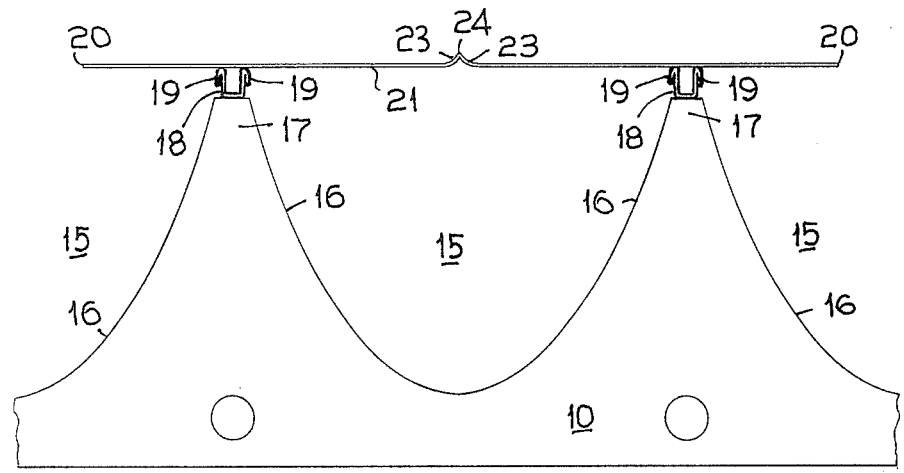
FIG. 6 is an enlarged fragmentary view showing in cross-section how the reflectors are preformed from a sheet of material prior to being forced into the template.

At the top of the ridges 17 of these templates, which ridges are formed between the recesses 15, are a series of locking members 18 which are of channel cross-section as shown particularly in FIGS. 5 and 6 their longitudinal edges 19 down turned to form ridges along the sides of the channel the purpose of which is to engage the edges 20 of sheets 21 which form the reflectors 14 when the sheets are engaged in the recesses 15 of the templates and hold the reflectors in firm contact with the contours of the recesses 15 which are formed in the templates. The rectangular sheet reflectors 14, when forced into the required curved shape by pressing them into the recesses 15 of the templates 10, are firmly maintained in their correct somewhat parabolic form.

The reflectors 14 are trough shaped and upwardly open and are formed of metal sheets as shown particularly in FIG. 5 and are preformed at the centre as shown in that figure to have a pair of curved surfaces 23 one on each side of a ridge 24, and after the sheets 21 have been formed in this way at the centre portion, the sheets are pressed down into the recesses 15 of the templates until they fit firmly against the templates as shown more particularly in FIG. 6, at which stage the edges 20 of the sheets engage firmly beneath the down turned edges 19 of the channel-shaped locking members 18 and the sheets 21 are then held firmly in contact with the walls of the recesses 15 of the templates 10 and along their edges 20 to define the reflector.

Because the centre of each sheet was preformed to have the curved portions 23 at the centre of each sheet 21, the reflectors 14 when held in curved form by the templates 10 comprise a parabolic section 25 on each side of a medial plane 26 which coincides with the ridge 24, which parabolic sections are joined to the ridge 24 by the pre-curved surfaces 23.

Figure 7:
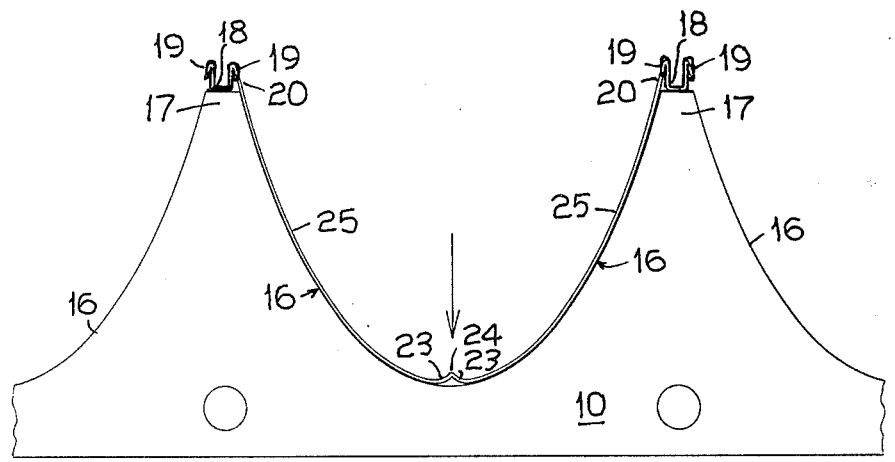
FIG. 7 is a similar view but showing the sheet forced down into the template and locked in place.
Figure 4:
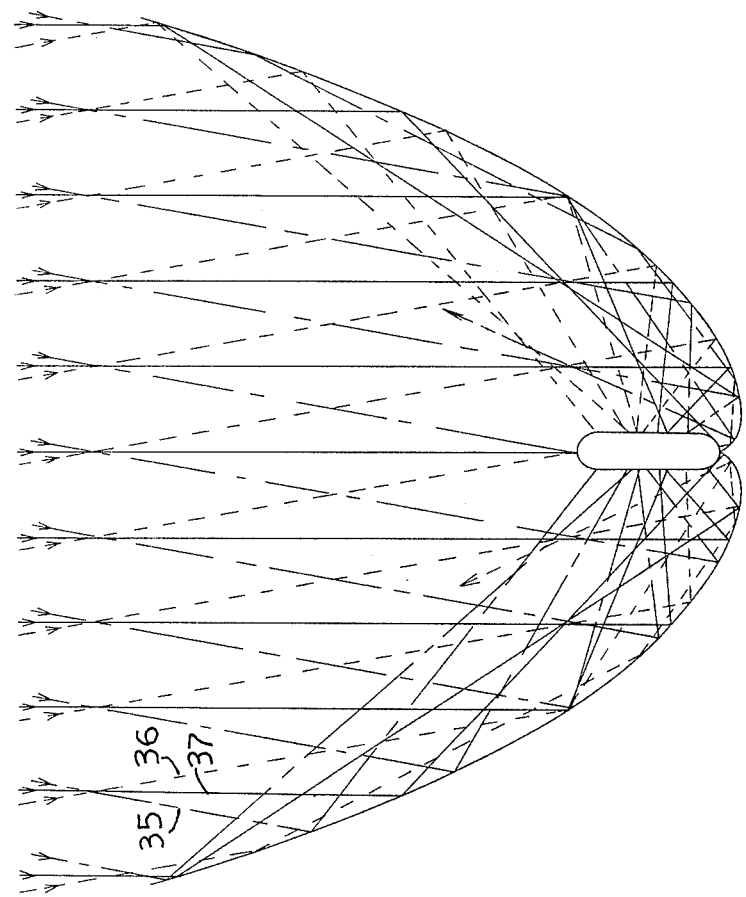

As seen also from FIG. 7 the reflectors have the axes 27 which are the axes about which the parabolic sections 25 are formed, spaced apart and, instead of being parallel the one to the other, they are angled so that the two axes 27 defined between them a wedge shape with and about the medial planes 26 of the reflector 14, which wedge has its apex outside of the reflector.

It has been found that by forming a reflector to consist of two independent parabolic curved sections 25 arranged about inclined axes, one on each side of the medial plane through the reflector, and having the parabolic sections 25 joined by two curved surfaces 23 at the centre, that such a reflector collects the rays of the sun and reflects them in a highly effective manner.

This is shown more particularly in FIG. 9 where it will be seen that although the angle of the sun as indicated by the lines 35 and 36 may be at 10° to the normal central plane 26 of the reflector 14, on either side, the reflected ray will still strike the heat absorbing tube 30 which, as will be seen from the illustrations, is of flattened form so that it has upper and lower curved sections 31 and 32 join into relatively flat sections 33, the purpose of this being to have the rays strike the body of this tube at an acute angle rather than being tangential to the tube as is normal in earlier devices of this type and this ensures that there is a maximum collection of heat by the absorber surface of the tube 30. The lines 37 indicate the light path when the sun is normal to the reflectors.

Figure 3:
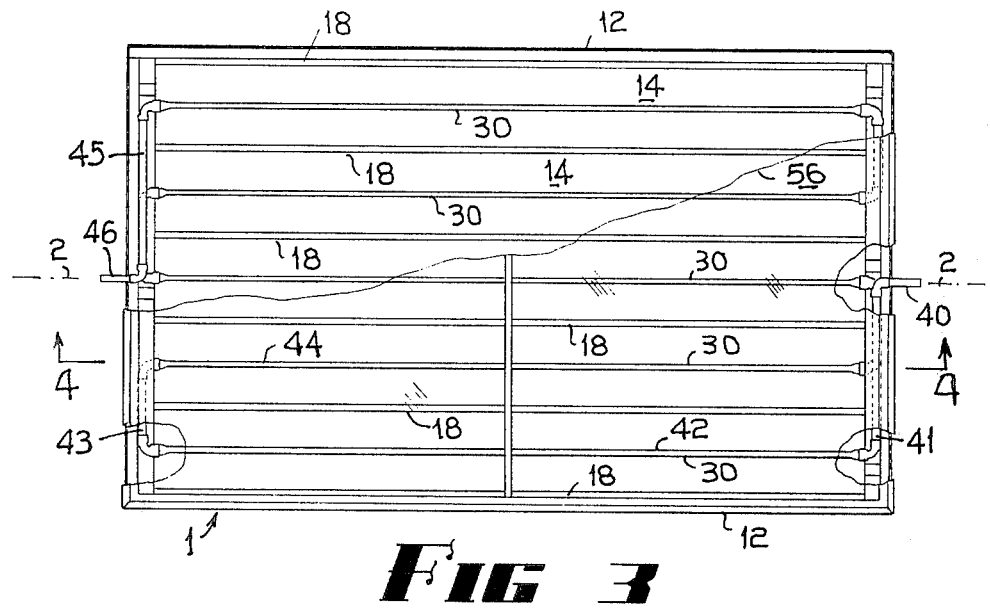
FIG. 3 is a sectional plan of the frame, without the reflectors, showing the heat collector tube.
Figure 4:
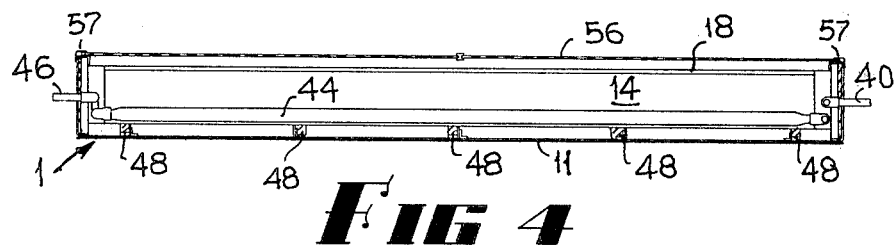
FIG. 4 is a transverse section in line 4—4 of FIG. 3.

The tube 30 can be formed of any suitable material such as metal which is a good heat collector has its outer surface treated to be heat absorbent such as by having a black coating on it, and the longitudinal form of the tube will be seen from FIG. 3 to have an inlet section 40 which is axial in relation to the box or frame and the tube then extends downwardly at 41 to pass horizontally at 42 through the lowermost reflector 14 and then up at 43 and back at 44 through the next reflector and so on, the tube passing down at 45 from the upward most reflector to the part which forms the outlet 46.

In this way a flow fluid can take place in series through the focal plane of each of the reflectors, the liquid flow preferably being generally upward from the lowermost reflector to the uppermost reflector and the heated fluid such finally passing from the tube through the outlet section 46 along the axis 2 of the frame, the inlet section 40 also being on the axis 2, which ensures that the base frame 1 can be orientated periodically to be within 10° on either side of the normal plane of the sun's rays during that cycle.

The templates 10 are secured in the box which forms the frame 1 by attaching them to bearers 48 which extend across the floor 11 of the box frame, and where the box is formed of fibreglass material the templates can be firmly bonded by fibreglass to the frame.

The locking members 18 which extend across the peaks of the template are secured by means of brackets 49 secured to the locking members and to the upper portions of the ridges 17 of the templates to form a rigid and accurately defined form which then ensures that, when the sheets 21 which form the reflectors 14 are pressed into position and are locked, the reflectors 14 will have the required shape and this will be maintained as the sheets 21 are free to expand end-wise where there is sufficient space left to allow any such expansion. Because the locking members 18 are "U" shaped and are engaged at a angle by the edge of the reflector, the locking members can distort inwards at their upper edges to allow expansion of the sheets 21 in a transverse plane.

The tube 30 is locked down to the box frame 1 by having support screws 52 passing through apertures in the reflectors and engaged in transverse members 53 secured to the floor 11 of the box frame 1 and to the templates 10 which support screws 52 have apertured heads so that a tie member 54 such as a wire can pass through the apertures and encircle the tube 30 to hold the heat collector tube firmly and with minimal thermal contact area on the support screws 52 the height of the tube in the reflector being selected by screwing the support screws in or out.

To prevent cooling by convection currents of air, the box frame 1 has across its top a sheet 56 of glass or other material which is transparent to the rays of the sun, and such a member can conveniently be held to the box frame by angle members 57 at the top of the sides 12 of the box frame 1.

Because the reflectors 14 are each formed independently and are each supported at intervals by the templates 10 which also form the sheets into the exact required shape and have their longitudinal edges firmly held by locking members 18, a relatively cheap and simple form of reflectors results which maintain their correct configuration unlike reflectors which were preformed to the required contour.

It will be realised that it is relatively simple to cut the parabolic walls which define the edges of the recesses 15 of the templates by computerized manufacture to give a high degree of accuracy to the curves and, when these templates 10 are placed into a box frame with the required lateral spacing, the necessary accuracy is present so that the sheets which are relatively light weight material with a required surfacing 58 of silver or the like can simply be placed into position after part folding the centre part to give the simple ridge 24, and two curved sections 23 which are not defined by the template but the main reflective surface will then be strictly defined by the templates and will be maintained in accurate position throughout their life.

The reflectors are thus formed of the material which itself does not have to be accurately shaped other than to be formed from a flat sheet of a nature such that the sheet can be bent about a longitudinal plane and the accurate forming thus occurs through the forcing of this sheet into the templates of the somewhat rigidly constructed box frame. The reflectors have open ends but have adjacent to them at the ends of the box frame 1 silvered or otherwise reflective members 60 where they face the reflectors so that while on one side part of the reflector may be shaded at low angle of the sun at the beginning of a day, the other end has extra reflector properties to make good this loss, and similarly at the end of the day.

It would also be possible to have the end faces of the box frame of a transparent material to permit the rays maximum access ro the reflective surfaces but generally for the sake of rigidity it is preferred to have a box frame which has a perimeter wall which is sufficiently strong to ensure that there will be no distortion of the box frame and which will adequately support the air current excluding upper sheet of glass or similar light transmitting material.

I claim:
1. A solar energy collector comprising;
   (a) a plurality of elongated upwardly-open trough-shaped reflectors placed side by side and each having facing surfaces joined by a curved section, each of said reflectors being formed by selecting a rectangular flat flexible sheet which has a reflective surface,
   (b) a series of templates spaced along the said reflectors and having upwardly opening recesses the walls of which engage and shape the said reflectors when said sheets are pressed downwards into the said recesses whereby to each form an upwardly-open trough-shaped reflector having the said facing surfaces of parabolic form joined by the said curved section, the axis of the said parabolic surfaces being disposed about a medial axis of the trough but with the axes of the parabolic surfaces displaced outwardly from the said medial axis and inclined thereto to intersect outside of the said reflector on the reflector medial axis but beneath the said curved joining section,
   (c) locking members engaged on the said templates between the said recesses and engaging the edges of the said reflectors to retain them in the said recesses,
   (d) a frame supporting the said templates in spaced relationship,
   (e) means to support the said frame to allow it to be orientated about a horizontal axis positioned in line with the axis of the said elongated reflectors, and
   (f) a heat collector tube supported by the said frame and disposed at the focal area of each of the said reflectors and constructed to act as an absorber of heat focused on to it by the said reflectors.

2. A solar energy collector according to claim 1 wherein said locking members extend along a medial line of the templates and have longitudinal edges bent back to lie against the sides of the said members to form ridges which are positioned to be engaged by the longitudinal edges of the said reflectors.

3. A solar energy collector according to claim 1 wherein the said frame is a box frame comprising a floor and upstanding sides formed of fibreglass and has on the floor a series of spaced bearers bonded to the said fibreglass floor and to the said templates and arranged to support the said heat collector tube.

4. A solar energy collector according to claim 3 including screws engaged in the said bearers adjacent the lower centre of the said recesses, and by ties passed through apertures in the heads of the said screws and around the said heat collector tubes, said reflectors being apertured to allow the screws to project therethrough to support the said heat collector tubes at the focal area of the said reflectors.

5. A solar energy collector according to claim 1 or 2 wherein said heat collector tube has an inlet coincident with the said axis of the said frame and an outlet coincident with the said axis on the other side of the said frame whereby the said inlet and outlet portions of the tube form the orientation axis of the said frame, and in that the said tube is continuous and passes through each of the said reflectors.

6. A solar energy collector according to claim 1 or 2 wherein the displacement of axes of the parabolic sections of the reflector on each side of the medial plane of the said reflector, and the dimension of the heat collector tube, are such that solar rays entering the said reflector over an arc of up to 10° on each side of the said medial plane are directed on to the said heat collector tube, the said heat collector tube being elongated in the direction of the said medial plane.

7. A solar energy collector comprising:
- a plurality of elongated upwardly-open trough-shaped reflectors placed side by side and each having facing curved reflective surfaces joined by a curved central section disposed about a medial axis of the trough, the said reflectors having the said facing surfaces of parabolic form joined by the said curved section, the axis of the said parabolic surfaces being disposed about a medial axis of the trough but with the axes of the parabolic surfaces displaced outwardly from the said medial axis and inclined thereto to intersect outside of the said reflector on the reflector medial axis but beneath the said curved joining section,
- a series of templates spaced along the said reflectors and having upwardly opening recesses the walls of which engage and shape the said curved sections of the reflectors,
- locking member of "U" shape with outer downturned edges forming longitudinal ridges engaging on the said templates between the said recesses, said ridges engaging the edges of the said reflectors to retain them in the said recesses when forced downwards therein,
- a frame supporting the said templates in spaced relationship, and
- a heat collector tube supported by the said frame and disposed to extend through the focal area of each of the said reflectors and of elongated cross-section with the elongation extending on the said medial line of the said reflectors, said collector tube being carried by screwed support means on the said frame spaced at intervals and projecting freely through apertures in the said reflectors and having the said heat collector tube wire-tied thereto, whereby the height of the said tube is adjustable in relation to the focal area of the said reflectors and heat transfer to the said frame is minimised.

* * * * *